United States Patent Office 2,806,875
Patented Sept. 17, 1957

2,806,875
PREPARATION OF ALKARYL SULFONIC ACIDS

Paul E. Geiser, Glenview, Ill., assignor to Continental Oil Company, Ponca City, Okla., a corporation of Delaware No Drawing. Application June 21, 1954,
Serial No. 438,354

7 Claims. (Cl. 260—505)

This invention relates to an improved continuous process for the preparation of alkaryl sulfonic acids of high purity which can be used in the production of salts that are particularly useful as detergents. My improved process which will be disclosed more fully hereinafter is not only economical but the operating conditions are not critical, thus making for a practical commercial process.

Briefly, the invention may be described in tabular form as follows:

I. Raw materials:
   A. Olefinic materials
   B. Aromatic hydrocarbon
II. Processing steps:
   A. Preparation and purification of the alkylated aromatic hydrocarbon—
      1. Condensation
      2. Sludge separation
      3. Acid treatment
      4. Caustic wash
      5. Fractionation
   B. Sulfonation In its broadest aspects, the invention comprises the alkylation of an aromatic hydrocarbon such as benzene or toluene with an olefin containing from 8 to 18 carbon atoms in the molecule in the presence of an alkylation catalyst and at an elevated temperature. Following the reaction the catalyst sludge is allowed to settle after which the sludge is drawn off. The crude alkyl substituted aromatic compound is extracted with sulfuric acid which removes color and odor precursors. After extraction with the sulfuric acid, the product is neutralized with alkali and the excess alkali removed. Finally, the product is subjected to fractional distillation whereby an alkyl substituted aromatic compound is obtained as a heart cut fraction which is substantially free of color and odor precursors. The purified product is then sulfonated to produce a sulfonic acid possessing excellent color and odor.

In order to disclose the nature of the present invention still more clearly, the individual steps as given above in tabular form will be described in detail and illustrated by specific examples. In the examples all parts are by weight.

I. RAW MATERIALS

The olefin may be either a straight or branched chain mono-olefin containing from about 8 to about 18 carbon atoms per molecule. Olefins of particular value in my invention are those obtained by the polymerization of ethylene, propylene, or butylene such as dodecene. Best results are obtained using benzene or toluene as the specific aromatic hydrocarbon; however, other aromatic hydrocarbons may be used if desired.

II. PROCESSING STEPS
A. PREPARATION AND PURIFICATION OF THE ALKYLATED AROMATIC HYDROCARBON
1. Condensation In actual operation the specific reagents, the amount of each, and the reaction conditions may be varied widely. Theoretically in the process one mole of the aromatic hydrocarbon reacts with one mole of the olefin. In practice, however, I prefer to employ an excess of the aromatic hydrocarbon over the olefin. Generally the mole ratio of aromatic hydrocarbon to the olefin may vary between the limits of 3.8:1 and 10:1; preferably between 5:1 and 7.5:1. Another variable is the alkylation catalyst. Preferred catalysts are those of the Friedel-Crafts type, especially aluminum chloride and complexes thereof. Other catalysts which may be used include sulfuric acid, sulfonic acids, hydrogen chloride, hydrogen fluoride, boron trifluoride, zinc chloride, activated bleaching earths, and phosphoric acid. When aluminum chloride is used a better final product in respect to color and odor is obtained than when other alkylation catalysts are used. In respect to the amount of aluminum chloride catalyst, that may vary from 1 to 5 percent; preferably 2 to 3 percent, based upon the total amount of olefin and aromatic hydrocarbon present. The condensation reaction is carried out within the temperature range of from about 100 to 160° F. with agitation. The reaction time, as is true of most chemical reactions, varies inversely as the temperature, the higher the temperature the shorter the reaction time. Generally it may be stated, however, that the reaction time may vary from a few minutes to about one hour.

EXAMPLE 1.—ALKYLATION OF BENZENE 2,500 parts of benzene and 20 parts of anhydrous aluminum chloride were added to a reaction vessel at room temperature after which 1,430 parts of dodecene and 40 additional parts of the aluminum chloride were slowly added, which caused the temperature to increase to 130° F. The mixture was agitated for a period of 30 minutes during which time the temperature was maintained at 130° F.

2. Sludge separation

Following the reaction between the aromatic hydrocarbon and the olefin in the presence of the alkylation catalyst, the resulting mixture is allowed to settle for approximately 30 minutes after which period the catalyst sludge is drawn off. If desired an additional quantity of the catalyst may be added, the resulting mixture agitated and again allowed to settle after which the catalyst sludge is drawn off.

EXAMPLE 2

After allowing the reaction mixture of Example 1 to settle for 30 minutes the catalyst sludge was withdrawn. 30 additional parts of aluminum chloride catalyst was added, the resulting mixture was agitated for another 30 minute period, allowed to settle for 30 minutes, and then the catalyst sludge was withdrawn as before. Approximately 3,750 parts of the alkylation product (crude detergent alkylate) was obtained.

While the foregoing is essentially a batch process, benzene, toluene, or other aromatic hydrocarbon may be alkylated continuously following the teachings of U. S. Patent 2,477,382.

3. Acid treatment

Color and odor precursors contained in the crude alkyl substituted aromatic compound are removed by extraction with sulfuric acid. Both the concentration and the quantity of the sulfuric acid used as a selective solvent for the color and odor precursors may be varied. Suitable and preferred quantities of the acid may vary from 1 to 25 percent and 3 to 10 percent, respectively, based upon the amount of crude alkylation product present. Suitable and preferred concentrations of the sulfuric acid may vary from 80 to 100 percent and 90 to 95 percent, respectively. The temperature employed in the extraction step is not critical; for convenience I prefer a temperature of about 70° F. The extraction of the crude alkylation product may be carried out either as a batch process or as a continuous process. Continuous extraction is preferred in which case the crude product may be purified as will be described in Example 4 or it may be subjected to a counter-current extraction. If the latter procedure is followed, the crude product is introduced into an extraction column near the base of the column from where the crude product flows upward against a descending stream of sulfuric acid. The alkylation product substantially free of color and odor precursors is withdrawn from the top of the column and sulfuric acid containing the color and odor precursors is withdrawn from the base of the column.

EXAMPLE 3.—TREATMENT OF THE CRUDE DETERGENT ALYKLATE WITH SULFURIC ACID—BATCH PROCESS 1,000 parts of the crude alkylation product of Example 2 was agitated with 30 parts of 93.2 percent sulfuric acid for about 15 minutes at a temperature of 70° F. After allowing the mixture to settle for about 15 minutes two layers were formed, an upper layer consisting predominantly of the alkylation product and a lower or sulfuric acid layer consisting predominantly of sulfuric acid having dissolved therein the color and odor precursors.

EXAMPLE 4.—TREATMENT OF THE CRUDE DETERGENT ALKYLATE WITH SULFURIC ACID—CONTINUOUS PROCESS

A stream of the crude alkylation product of Example 1 and sulfuric acid of 93.2 percent concentration were introduced into a contactor equipped with an agitator at a rate of 1,000 and 30 parts per hour, respectively. From the contactor the mixture flowed to a settling chamber at a rate of 1,030 parts per hour where two liquid layers formed. The lower layer consisting predominantly of sulfuric acid having incorporated therein the color and odor precursors was continuously withdrawn while the upper layer consisting predominantly of the alkylation product containing a small amount of sulfuric acid is neutralized as described below.

4. Caustic wash

Any sulfuric acid contained in the alkylated aromatic hydrocarbon layer following extraction with sulfuric acid is neutralized by washing with an aqueous alkali solution such as sodium hydroxide, potassium hydroxide, or other base. A preferred concentration of the alkali is about 5 percent, however, concentrations above or below this value may be used.

EXAMPLE 5

The acid washed product of Example 3 was contacted with a 5 percent aqueous sodium hydroxide solution to neutralize the excess acidity.

The upper layer from Example 4 consisting predominantly of the purified alkylation product was continuously transferred to a neutralizer where the excess acidity was neutralized by adding thereto a 5 percent aqueous sodium hydroxide solution.

5. Fractionation

Since the condensation is effected in the presence of an excess of the aromatic compound, the resulting product after extraction with sulfuric acid will contain a considerable quantity of the unreacted aromatic hydrocarbon. In addition, it will contain some lower molecular weight monoaryl alkanes, a large fraction of the alkyl substituted aromatic hydrocarbon, and finally some heavier, higher-boiling bottoms consisting predominantly of polyalkyl substituted aromatic compounds. The desired product may be recovered from the other components in the mixture by fractional distillation under reduced pressure. The temperature at which the different components are removed by distillation is dependent upon the identity of the component and upon the pressure at which the distillation is conducted. Generally, a pressure of about 20 mm. of mercury is maintained during the distillation and, as a rule, at this pressure the unreacted aromatic hydrocarbon and the lower molecular weight monoaryl alkanes will be removed below about 220° F. and the desired alkyl substituted aromatic will be obtained over a temperature range of about 220° to about 450° F. For best results, however, I prefer to collect the desired product over a somewhat more limited temperature range; namely, 282 to 392° F.

EXAMPLE 6

The neutralized product of Example 3 neutralized according to the method described in Example 5 was subjected to fractional distillation at a pressure of 20 mm. of mercury. 386 parts of the purified detergent alkylate was collected as a distillate over a temperature range of 282 to 392° F. which had a mild pleasant odor, a Klett color of 70, and a Saybolt color of 26+.

The neutralized product of Example 4 neutralized according to the method described in Example 5 was subjected to fractional distillation also at a pressure of 20 mm. of mercury. 391 parts of the purified detergent alkylate was collected as a distillate over a temperautre range of 282 to 392° F. which had a mild pleasant odor, a Klett color of 68, and a Saybolt color of 27.

The purified detergent alkylate obtained by the neutralization and fractionation by either of the processes described above is sometimes called dodecylbenzene. The physical properties of this product are as follows:

| | |
|---|---|
| Specific gravity at 60° F | 0.8742 |
| Average molecular weight | 232 |
| Percent sulfonatable | 99+ |
| A. S. T. M., Engler: | |
| I. B. P ° F | 535 |
| 5 ° F | 545 |
| 50 ° F | 560 |
| 90 ° F | 580 |
| 97 ° F | 593 |
| F. B. P ° F | 603 |
| Refractive index at 77° F | 1.4863 |
| Viscosity at— | |
| 32° F centipoises | 37 |
| 68° F do | 14 |
| Aniline number ° F | 48.5 |

B. SULFONATION

The product is then sulfonated by the continuous sulfonation process disclosed in the co-pending application by H. E. Luntz and D. O. Popovac, Serial No. 396,822, filed December 8, 1953, now U. S. Patent No. 2,768,199, entitled "Method of Sulfonating Alkyl Aromatic Hydrocarbons." This latter invention is assigned to the present assignee and the disclosure contained therein is made a part of this application. In brief, Luntz and Popovac disclose a method of sulfonating an alkyl aromatic hydrocarbon wherein the sulfonatable material is introduced into one end of a modified Votator and in passing therethrough the sulfonatable material forms a film on the refrigerated surface of the Votator. When first contacted with the sulfonating agent (sulfur trioxide admixed with dry air) the film is only partially sulfonated and is removed in that condition by the progressively moving scrapers. The partially sulfonated material is then re-applied to the refrigerated surface farther along in the Votator as a film and contacted with an additional quantity of the sulfonating agent. The steps of removing the film, re-applying to the surface, and contacting with an additional quantity of the sulfonating agent are repeated until the completely sulfonated material is removed from the other end of the Votator. The total residence time of the sulfonatable material in the Votator may vary from a fraction of a second to 5 seconds when the temperatures employed vary from about 50 to about 200° F. The Votator when so used is highly efficient as a heat exchanger and as a result the temperature of the reaction mixture and the temperature of the refrigerated surface differ by a few degrees only.

EXAMPLE 7

The purified detergent alkylate was continuously sulfonated in a modified Votator having .7 square feet of heat exchanger surface, two scraper blades, and 9 jets for the introduction of sulfur trioxide before each scraper blade. The Votator shaft was operated at 400 r. p. m. 29 pounds per hour of the detergent alkylate purified in accordance to Example 6 (neutralized product of Example 4) was charged to the Votator. At the same time 0.7 cubic feet of sulfur trioxide admixed with 8 cubic feet per minute of dry air was introduced into the Votator. Contact time was approximately ¼ second. Cooling water at a temperature of 60° F. was passed through the jacket of the Votator resulting in an exit temperature of the sulfonated product of 167° F. There was obtained 38.6 pounds per hour of the alkaryl sulfonic acid.

In order to prepare the detergent the sulfonic acid is neutralized using any one of a wide variety of bases. Suitable bases include: alkali metal hydroxides, particularly sodium or potassium hydroxide, or ammonium hydroxide, or mixtures thereof, are particularly suitable although alkaline earth metal hydroxides such as calcium and magnesium hydroxides, or organic bases such as amines, including alkanolamines such as the ethanolamines, morpholine and the like, may also be used.

The neutralized product is a white to a light colored slurry which may be used as such or drum or spray dried with or without addition of builders such as sodium tripyrophosphate or the like to obtain a free flowing, non-hydroscopic powder of good odor and high detergency in both hard and soft water.

While the present invention has been described in conjunction with preferred embodiments, it is to be understood that modifications and variations may be resorted to without departing from the spirit and scope of the invention as those skilled in the art will readily understand. Upon the other hand, there are certain processing steps which must be followed rigidly in order to produce alkaryl sulfonic acids having good color and odor properties. The steps which cannot be altered are: condensation, sludge separation, acid treatment, caustic wash, and fractionation. It would be expected that equal results would be obtained whether or not fractionation preceded or followed acid treatment and caustic wash. My experiments demonstrate that this is not so. If the product is distilled prior to extraction and alkali wash, the final product is dark in color and possesses an off odor. Although I do not wish to be bound by any theory as to why better results are obtained by following the process steps in the order enumerated, I believe a correct explanation of these results is substantially as follows: Fractionation must follow acid treatment and alkali wash because even after allowing the mixture to settle followed by the removal of the catalyst sludge, there will still be small particles of the aluminum chloride catalyst suspended in the liquid. If the liquid containing suspended aluminum chloride is heated a portion of the liquid will be decomposed resulting in a dark colored product having an off odor. Acid treatment and alkali washing remove the aluminum chloride particles suspended in the liquid.

If one of the less preferred alkylation catalysts were used instead of aluminum chloride, as for example, hydrogen chloride, the process would be modified as follows: Instead of employing the sludge separation step to remove the greater portion of the catalyst, the mixture would be washed with water after which the reaction mixture would be processed as described above.

What is considered new and inventive is defined in the hereunto appended claims, it being, of course, understood that equivalents known to those skilled in the art are to be construed as within the scope and purview of the claims.

Accordingly applicant claims:

1. The process for the preparation of an alkaryl sulfonic acid comprising the steps: preparing a crude alkylation product by reacting an aromatic hydrocarbon with an olefin containing from 8 to 18 carbon atoms in the molecule in the presence of an alkylation catalyst at an elevated temperature and isolating the crude alkylation product therefrom; extracting the said crude alkylation product with sulfuric acid thus forming two phases, a first phase comprising the sulfuric acid having dissolved therein the color and odor precursors and a second phase consisting predominantly of the alkylation product, separating the phases, treating said second phase with an alkali to neutralize any sulfuric acid contained therein, fractionally distilling said second phase to recover therefrom the purified alkylation product; passing said purified alkylation product to a reactor wherein it is brought into contact with a refrigerated surface, progressively moving a scraper over said surface, introducing a gaseous mixture consisting of SO3 and an inert diluent into said alkylation product at a point adjacent said surface and closely adjacent said scraper, and then collecting the sulfonated product.

2. The process for the preparation of an alkaryl sulfonic acid substantially free of colored and odorous constituents comprising the steps: preparing a crude alkylation product by reacting an aromatic hydrocarbon with an olefin containing from 8 to 18 carbon atoms in the molecule in the presence of aluminum chloride as an alkylation catalyst at an elevated temperature and isolating the crude alkylation product therefrom; extracting the said crude alkylation product with sulfuric acid thus forming two phases, a first phase comprising the sulfuric acid having dissolved therein the color and odor precursors and a second phase consisting predominantly of the alkylation product, separating the phases, treating said second phase with an alkali to neutralize any sulfuric acid contained therein, fractionally distilling said second phase to recover therefrom the purified alkylation product; passing said purified alkylation produced to a reactor wherein it is brought into contact with a refrigerated surface, progressively moving a scraper over said surface, introducing a gaseous mixture consisting of SO3 and an inert diluent into said alkylation product at a point adjacent said surface and closely adjacent said scraper, and then collecting the sulfonated product.

3. The process for the preparation of an alkaryl sulfonic acid substantially free of colored and odorous constituents comprising the steps: preparing a crude alkylation product by reacting an aromatic hydrocarbon with an olefin containing from 8 to 18 carbon atoms in the molecule in the presence of an alkylation catalyst at an elevated temperature and isolating the crude alkylation product therefrom; extracting the said crude alkylation product with sulfuric acid in the proportion of 1 to 25 parts of sulfuric acid per 100 parts of crude alkylation product thus forming two phases, a first phase comprising the sulfuric acid having dissolved therein the color and odor precursors and a second phase consisting predominantly of the alkylation product, separating the phases, treating said second phase with an alkali to neutralize any sulfuric acid contained therein, fractionally distilling said second phase to recover therefrom the purified alkylation product; passing said purified alkylation product to a reactor wherein it is brought into contact with a refrigerated surface, progressively moving a scraper over said surface, introducing a gaseous mixture consisting of SO3 and an inert diluent into said alkylation product at a point adjacent said surface and closely adjacent said scraper, and then collecting the sulfonated product.

4. The process for the preparation of an alkaryl sulfonic acid substantially free of colored and odorous constituents comprising the steps: preparing a crude alkylation product by reacting an aromatic hydrocarbon with an olefin containing from 8 to 18 carbon atoms in the molecule in the presence of an alkylation catalyst at an elevated temperature and isolating the crude alkylation product therefrom; extracting the said crude alkylation product with sulfuric acid of a concentration varying within 80–100 percent in the proportion of 1–25 parts of sulfuric acid per 100 parts of crude alkylation product thus forming two phases, a first phase comprising the sulfuric acid having dissolved therein the color and odor precursors and a second phase consisting predominantly of the alkylation product, separating the phases, treating said second phase with an alkali to neutralize any sulfuric acid contained therein, fractionally distilling said second phase to recover therefrom the purified alkylation product; passing said purified alkylation product to a reactor wherein it is brought into contact with a refrigerated surface, progressively moving a scraper over said surface, introducing a gaseous mixture consisting of $SO_3$ and an inert diluent into said alkylation product at a point adjacent said surface and closely adjacent said scraper, and then collecting the sulfonated product.

5. The process for the preparation of an alkaryl sulfonic acid substantially free of colored and odorous constituents comprising the steps: preparing a crude alkylation product by reacting an aromatic hydrocarbon with an olefin containing from 8 to 18 carbon atoms in the molecule in the presence of an alkylation catalyst at an elevated temperature and isolating the crude alkylation product therefrom; extracting the said crude alkylation product with sulfuric acid of a concentration varying within 90–95 percent in the proportion of 3–10 parts of sulfuric acid per 100 parts of crude alkylation product thus forming two phases, a first phase comprising the sulfuric acid having dissolved therein the color and odor precursors and a second phase consisting predominantly of the alkylation product, separating the phases, treating said second phase with an alkali to neutralize any sulfuric acid contained therein, fractionally distilling said second phase to recover therefrom the purified alkylation product; passing said purified alkylation product to a reactor wherein it is brought into contact with a refrigerated surface, progressively moving a scraper over said surface, introducing a gaseous mixture consisting of $SO_3$ and an inert diluent into said alkylation product at a point adjacent said surface and closely adjacent said scraper, and then collecting the sulfonated product.

6. The process of claim 1 wherein the aromatic hydrocarbon is benzene.

7. The process of claim 1 wherein the aromatic hydrocarbon is toluene.

References Cited in the file of this patent

UNITED STATES PATENTS

| Number | Name | Date |
|---|---|---|
| Re. 22,548 | Brandt | Sept. 26, 1944 |
| 2,364,782 | Flett | Dec. 12, 1944 |
| 2,543,885 | Wilson | Mar. 6, 1951 |
| 2,616,936 | Mammen et al. | Nov. 4, 1952 |
| 2,630,302 | Jones | Mar. 3, 1953 |
| 2,688,633 | Cohen | Sept. 7, 1954 |
| 2,723,990 | Gilbert et al. | Nov. 15, 1955 |
| 2,740,807 | Rappen et al. | Apr. 3, 1956 |